(12) United States Patent
Chan et al.

(10) Patent No.: US 8,149,589 B2
(45) Date of Patent: Apr. 3, 2012

(54) CAPACITOR HOLDER

(75) Inventors: Chun-Kong Chan, Taipei County (TW);
Chi-Ching Chen, Taipei County (TW)

(73) Assignee: Lien Chang Electronic Enterprise Co., Ltd., Taipei County (TW)

( * ) Notice: Subject to any disclaimer, the term of this patent is extended or adjusted under 35 U.S.C. 154(b) by 0 days.

(21) Appl. No.: 12/859,553

(22) Filed: Aug. 19, 2010

(65) Prior Publication Data
US 2012/0044661 A1 Feb. 23, 2012

(51) Int. Cl.
*H05K 7/14* (2006.01)
*H05K 7/18* (2006.01)
(52) U.S. Cl. ........ 361/801; 361/763; 361/766; 361/821; 361/830; 257/723; 257/726
(58) Field of Classification Search .................. 361/801, 361/763, 766, 821, 830; 257/723–726
See application file for complete search history.

(56) References Cited

U.S. PATENT DOCUMENTS

| | | | | |
|---|---|---|---|---|
| 5,840,086 | A * | 11/1998 | Takami et al. | 29/25.03 |
| 6,323,440 | B1 * | 11/2001 | Maruyama et al. | 174/262 |
| 6,356,431 | B1 * | 3/2002 | Lin et al. | 361/307 |
| 2007/0103879 | A1 * | 5/2007 | Kambara et al. | 361/763 |

* cited by examiner

*Primary Examiner* — Yuriy Semenenko
*Assistant Examiner* — Andargie M Aychillhum
(74) *Attorney, Agent, or Firm* — Rosenberg, Klein & Lee

(57) ABSTRACT

A holder for mounting multiple capacitors onto a circuit board includes a main structure and a plurality of latching member. The main structure has a top plate and a plurality of side plates. The top plate includes a plurality of holding slots, with the latching members off the side plates. Each latching member has an extension portion and an engaging member. The engaging member is located at the end of the extension under the bottom edge of the side plate. The capacitor includes a main body and a pair of electric leads at one end of the main body. At the opposite end of the electric leads, the main body is bounded on top by the top plate of the main structure, where the main body of each capacitor emerges partially above the upper surface of the top plate.

10 Claims, 5 Drawing Sheets

CAPACITOR HOLDER

BACKGROUND OF THE INVENTION

1. Field of the Invention

The present invention relates to a capacitor holder; in particular, a holder for mounting multiple capacitors onto a circuit board.

2. Description of the Related Art

Capacitors are widely used for storing electrical charges, AC filtering, bypassing, smoothing, and blocking DC signals. Different capacitors have different characteristics suitable for different functions and applications. In particular, the electrolytic capacitors possess high static electricity storage capacity and low manufacturing cost. Thus, electrolytic capacitors are suitable for a wide range of applications including communications and electronic appliances, such as power supplies, motherboards, surveillance cameras, and audio players.

Conventionally, the electrolytic capacitors are mounted onto a circuit board by plugging the leads into pre-arranged holes on the circuit board. The electrolytic capacitors are then soldered to the circuit board in a tin soldering furnace. To prevent from falling off from the circuit board, spot gluing is applied between the electrolytic capacitors and the circuit board. However, the spot gluing process is often inefficient and the glue may peel off, resulting in the insecure installation of the electrolytic capacitors.

To solve the above issues, the inventor has proposed a new solution.

SUMMARY OF THE INVENTION

The object of the present invention is to provide a holder for mounting multiple capacitors securely.

The electrolytic capacitor includes a main body with two electric leads located at one end of the main body. The holder for the electrolytic capacitors includes a main structure, a top plate, and a plurality of side plates extending downward from the top plate. The top plate has a plurality of holding slots, where each holding slot holds one end of the electrolytic capacitor; namely, the end opposite of the electric leads. The main body of each electrolytic capacitor rises partially above the top surface of the top plate. Furthermore, the side plates extend downward to form a plurality of latching members. Each latching member includes an extension and an engaging member.

The present invention has the following advantages:

1. The multiple capacitor holder of the present invention provides better mounting security. Moreover, no spot gluing is required, as the holder can be installed easily in a short time to save labor cost.

2. The compactness of the instant capacitor holder provides excellent ability for space conservation, especially in the vertical direction.

3. In the event of capacitor explosion due to current overload, the capacitor holder may act as a barrier in containing the explosion, thus minimizing potential collateral damage.

In order to further the understanding regarding the present invention, the following embodiment is provided along with illustrations to facilitate the disclosure of the present invention.

DETAILED DESCRIPTION OF THE PREFERRED EMBODIMENT

The aforementioned illustrations and following detailed descriptions are exemplary for the purpose of further explaining the scope of the present invention. Other objectives and advantages related to the present invention will be illustrated in the subsequent descriptions and appended drawings.

Figure 1:
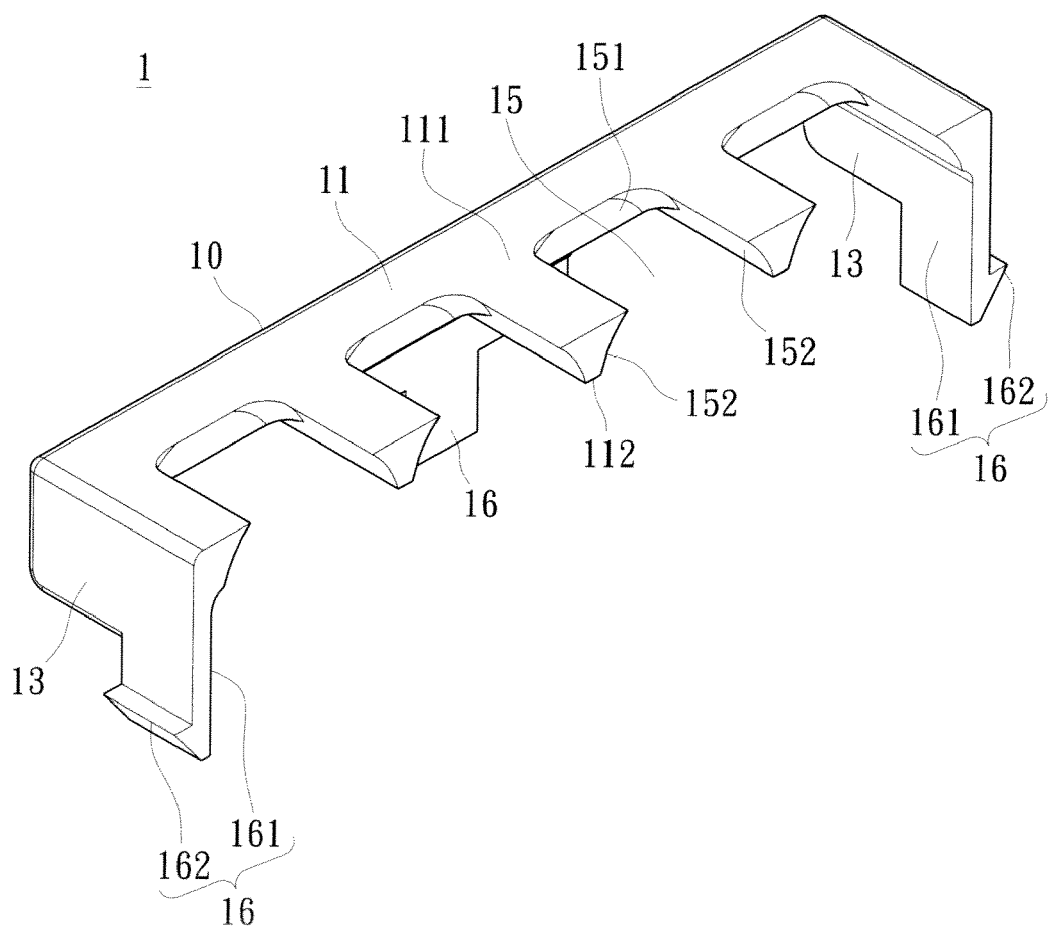
FIG. 1 shows a perspective view of a holder for multiple electrolytic capacitors of the present invention.
Figure 2:
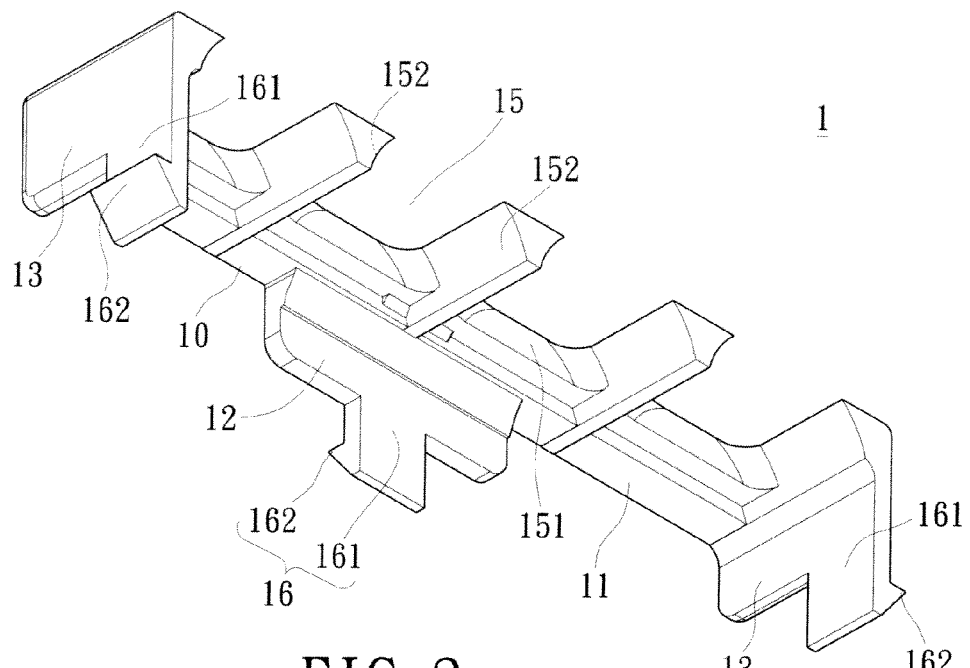
FIG. 2 shows an another perspective view of a holder for multiple electrolytic capacitors of the present invention.
Figure 3:
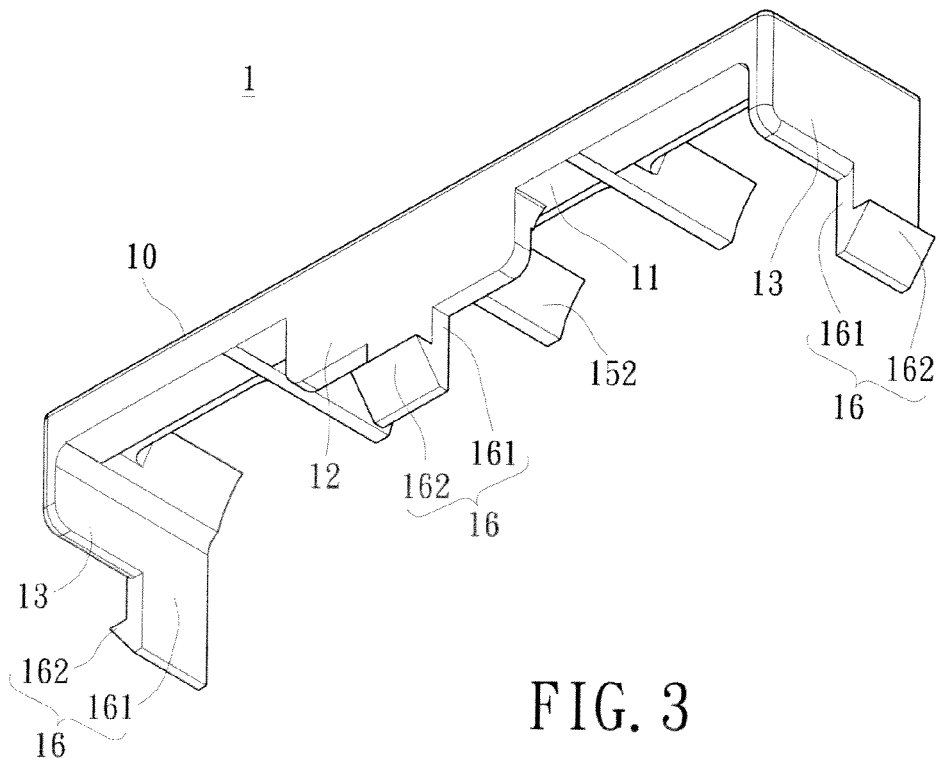
FIG. 3 shows an another perspective view of a holder for multiple electrolytic capacitors of the present invention.

Please refer to FIGS. 1 to 3. The present invention provides a holder 1 for mounting multiple electrolytic capacitors. The holder 1 is preferably made of plastic. The holder 1 comprises a main structure 10 and a plurality of latching members 16.

The main structure 10 consists of a top plate portion (hereinafter called top plate) 11 and a plurality of side plate portions (hereinafter called side plates) 12, 13. The front portion of the top plate 11 forms a plurality of holding slots 15 extending from below the bottom surface of the top plate 11 to the top surface 111 of the top plate.

The latching members 16 are located on the main structure 10 near the side plates 12, 13. Each latching member 16 has an extension 161 and an engaging member 162. The extension 161 points downward with respect to the top plate 11. Off the end of the extension 161 is the engaging member 162 protruding sideways and located below the bottom edge of the side plate 12, 13.

The number of the side plates 12, 13 and the latching member 16 depend on the operational requirement and are therefore not restricted. In the present embodiment, the side plate 12 extends downward off the rear of the top plate 11. The side plate 13 extends downward off the right and left side of the top plate 11 respectively. Thus, the total quantity of the side plate 12, 13 is three in the particular embodiment. Accordingly, a total of three latching members 16 are located off the main structure near the side plates 12, 13.

Furthermore, the upper half of the extension 161 of each latching member 16 is formed integrally as part of the side plate 12 and 13. The lower half of the extension 161 extends off the bottom edge of the side plate 12, 13. Alternatively, the upper half of the extension 161 of the latching member 16 can also be apart from the side plate 12, 13 (not shown). The above described components make up the holder 1 for multiple electrolytic capacitors of the present invention.

Figure 4:
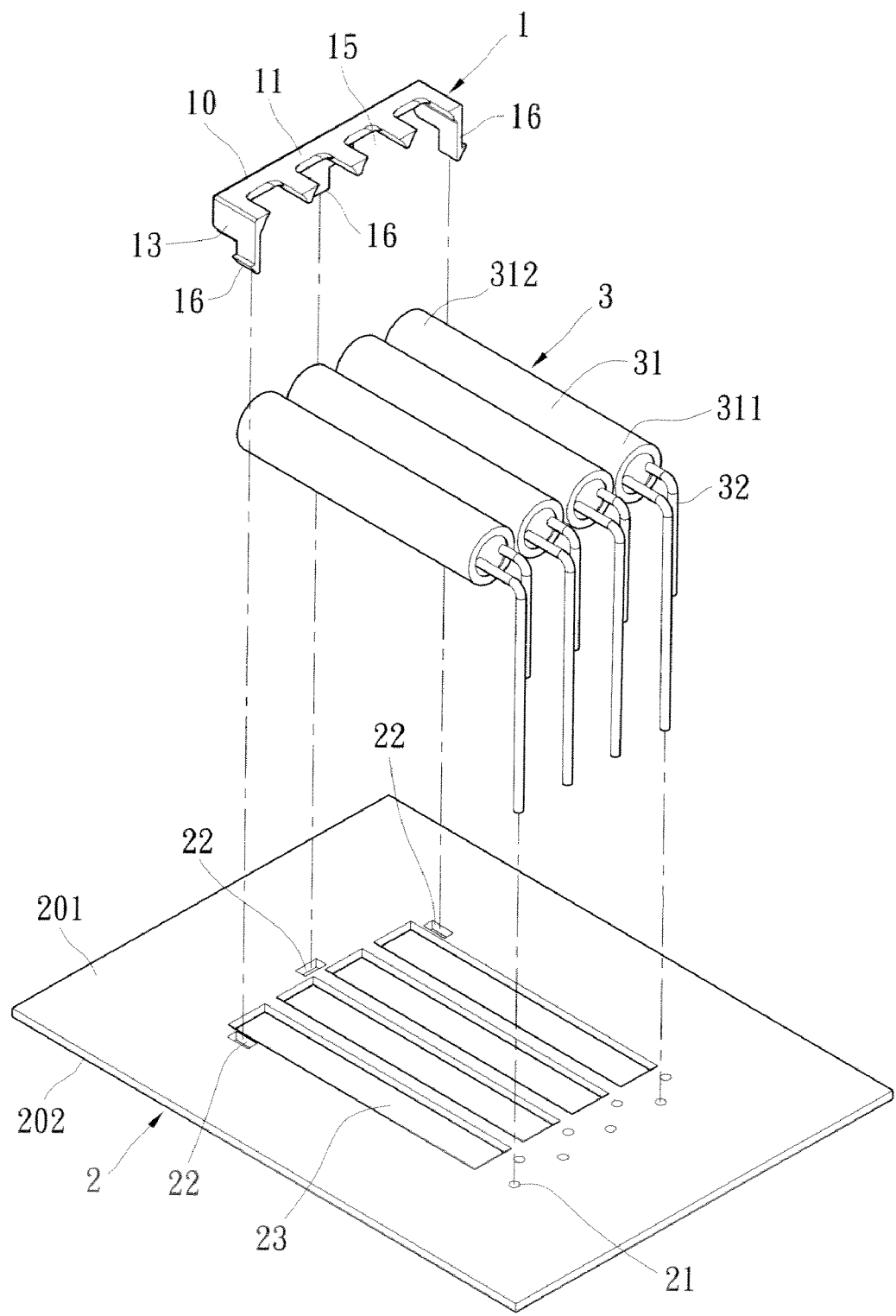
FIG. 4 shows an exploded view of a holder, electrolytic capacitors, and a circuit board of the present invention.
Figure 5:
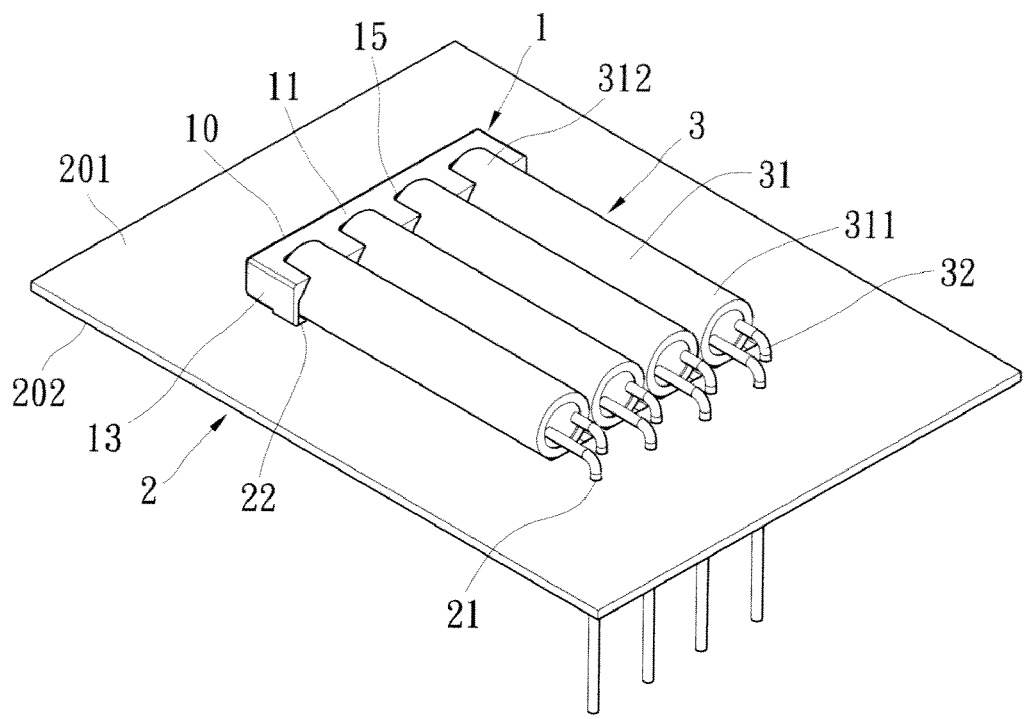
FIG. 5 shows an assembly view of a holder, electrolytic capacitors, and a circuit board of the present invention.
Figure 6:
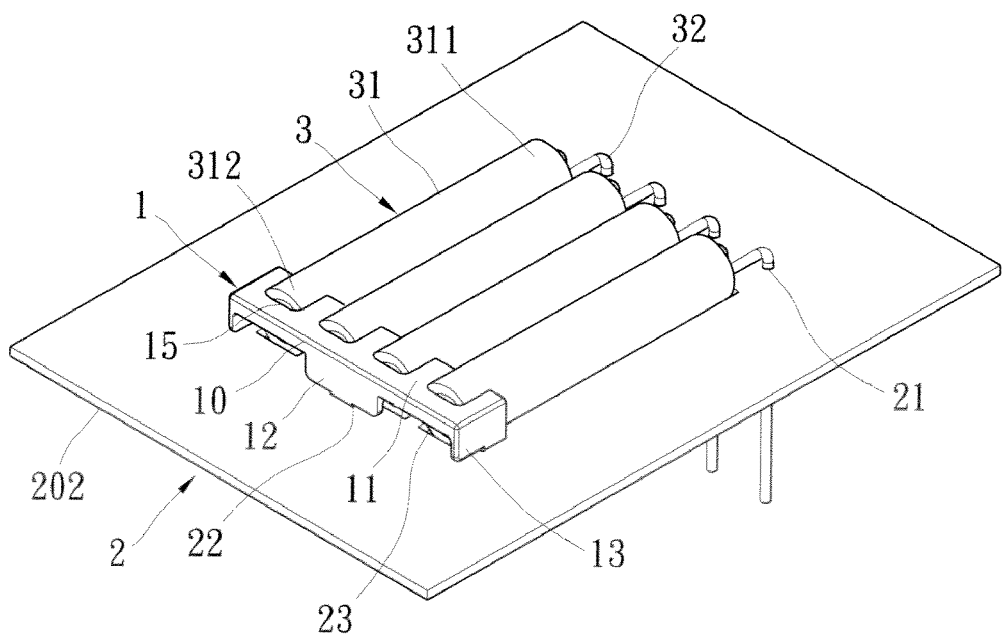
FIG. 6 shows another assembly view of a holder, electrolytic capacitors, and a circuit board of the present invention.

Please refer to FIGS. 4 to 6, which show the holder 1 mounting multiple electrolytic capacitors (i.e. EC capacitor, EC CAP) 3 onto the circuit board 2. Each electrolytic capacitor 3 comprises a main body 31 and two electric leads 32 located at one end of the main body 31. Parallel to the horizontal surface, the main body 31 is cylindrical with two opposite ends; namely the first end 311 and the second end 312. Each main body 31 is aligned with the corresponding holding slot 15 of the holder 1. The electric leads 32 are connected electrically to the main body 31 at the first end 311.

The two electric leads 32 have different polarities, with equal or different length dimensionally.

For plugging the electric leads 32, the circuit board 2 has a plurality of thru-holes 21. In addition, the circuit board 2 has a plurality of engaging slots 22 for correspondingly matching the latching members 16. When mounting the electrolytic capacitors 3, the electric leads 32 are plugged into the thru-holes 21 on the circuit board 2. Then, the electric leads 32 are soldered onto the circuit board 2 to connect securely and electrically.

When mounting the holder 1 for multiple electrolytic capacitors, the extension 161 of the latching member 16 penetrates through the engaging slot 22 of the circuit board 2. The engaging member 162 of the latching member 16 presses against the bottom surface 202 of the circuit board 2 (shown in FIG. 8). The bottom edge of the side plate 12,13 presses against the top surface 201 of the circuit board 2. The above locking mechanism allows the holder 1 for multiple electrolytic capacitors to be securely mounted on the circuit board 2.

For the main body 31 and opposite of the electric leads 32, the upper surface of the second end 312 is bounded by the top plate 11 of the holder 1. The bottom surface of the main body 31 is bounded underneath by the circuit board 2, thus securing the electrolytic capacitors 3. The main body 31 of each electrolytic capacitor emerges partially above the top surface 111 of the top plate 11. In other words, the top surface 111 of the top plate 11 is slightly below the outer surface of the main body 31.

Please refer to FIGS. 1 and 2 again. Each holding slot 15 is defined by an end wall 151 and a pair of side walls 152. The outer surface of the main body 31 is partially bounded by the side walls 152.

Furthermore, the side walls 152 of each holding slot 15 can have curved surface to fit tightly with the round outer surface of the main body 31.

Figure 7:
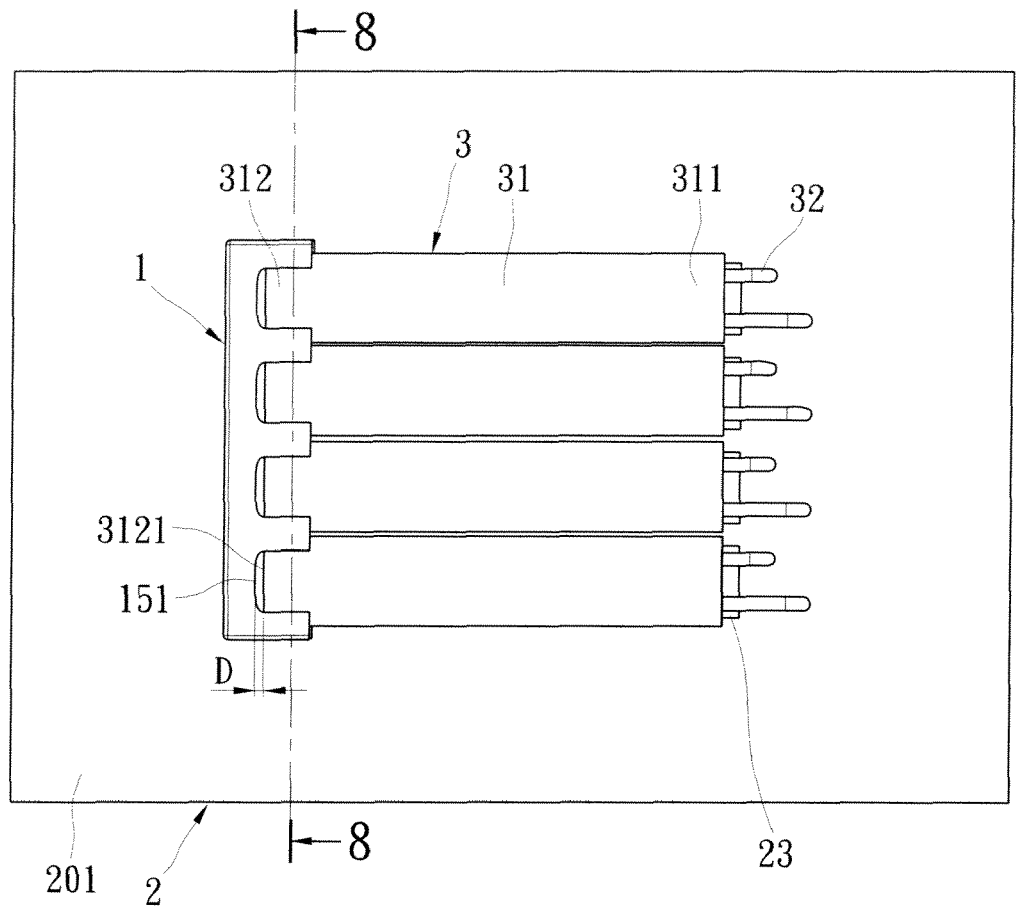
FIG. 7 shows a top view of a holder, electrolytic capacitors, and a circuit board of the present invention.

Please refer to FIG. 7. The holder 1 for multiple electrolytic capacitors is placed near the second end 312 of the main body 31. For each holding slot 15, the end wall 151 clears the end surface 3121 of the second end 312 by a distance D. Therefore, if the electrolytic capacitors ever explode due to current overload, the main structure 10 of the holder 1 would act as a barrier to contain the explosion, thus minimizing the explosion effect.

Figure 8:
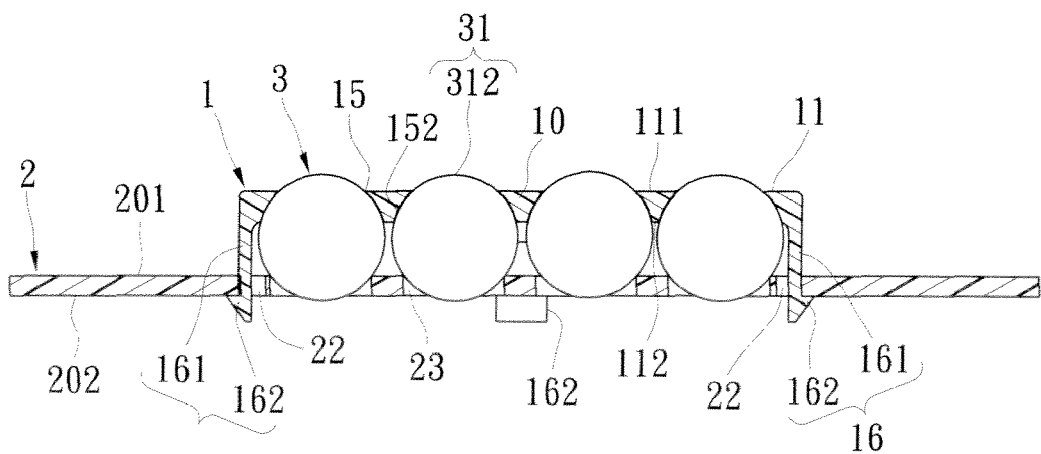
FIG. 8 is a cross-sectional view of FIG. 7.

Please refer to FIGS. 4, 7, and 8. For each main body 31 of the capacitor, a corresponding receiving slot 23 is located on the circuit board 2. Through each receiving slot 23, the main body 31 lays on the circuit board 2 and emerges partially from the bottom surface 202.

Hence, the present invention of the holder for multiple electrolytic capacitors have the following functions and characteristics:

1. Through the top plate and a plurality of holding slots, the holder for multiple electrolytic capacitors of the present invention helps to secure the main body of each electrolytic capacitor; namely at one end opposite of the electric leads. Even under heavy vibrations, the electrolytic capacitors would not be easily damaged or fall off from the circuit board. No spot gluing is needed, instead, the side plates and latches allow the holder to be installed easily in a short time to save labor cost.

2. For the present invention of the holder for multiple electrolytic capacitors, the top surface of the top plate is slightly lower than the outer surface of the main body of the electrolytic capacitors, with the capacitors lying down horizontally. Therefore, the holder does not occupy any additional space in the vertical direction above the capacitors.

3. The holder for multiple electrolytic capacitors is placed near the second end of the main body. If the electrolytic capacitors ever explode due to current overload, the main structure of the holder would act as a barrier in containing the explosion, thus minimizing the explosion effect.

The descriptions illustrated supra set forth simply the preferred embodiment of the present invention; however, the characteristics of the present invention are by no means restricted thereto. All changes, alternations, or modifications conveniently considered by those skilled in the art are deemed to be encompassed within the scope of the present invention delineated by the following claims.

What is claimed is:

1. A holder for mounting multiple capacitors, each capacitor having a main body and a pair of leads extending from one end thereof, onto a circuit board, the holder comprising:
   a main structure having a top plate portion and a plurality of side plate portions extending downward from the edges thereof, the top plate portion defining a plurality of holding slots, wherein each capacitor is cooperatively retained between the circuit board and the holder in each of the holding slots with the main body thereof partially emerges above the upper surface of the top plate portion of the holder, thereby reducing the overall vertical profile; and
   a plurality of latching members located on the side plate portions of the main structure, wherein each latching member includes an extension portion and an engaging member; the engaging member being located at the end of the extension portion and under the bottom edge of the side plate portion.

2. The holder of claim 1, wherein each holding slot is defined by an end wall and a pair of side walls, and wherein each side wall of the holding slot contacts the main body of the capacitor.

3. The holder of claim 2, wherein each side wall that defines the holding slot includes a contour correspondingly matching the external shape of the capacitor.

4. The holder of claim 3, wherein the leads of capacitor are arranged away from the holder.

5. The holder of claim 1, wherein the number of the side walls are three and the number of the latching members are three.

6. A capacitor holding apparatus, each capacitor having a main body and a pair of leads extending from one end thereof, the capacitor holding apparatus comprising:
   a holder, comprising:
      a main structure having a top plate portion and a plurality of side plate portions extending downward from the edges thereof; the top plate portion defining a plurality of holding slots;
      a plurality of latching members located on the side plate portions of the main structure, wherein each latching member includes an extension portion and an engaging member; the engaging member being located at the end of the extension portion and under the bottom edge of the side plate portion; and
   a circuit board having a plurality of engaging slots and receiving slots formed thereon, wherein each capacitor is cooperatively retained between the circuit board and the holder in each of the holding slots with the main body thereof partially emerges from the upper surface of the top plate portion, thereby reducing the overall vertical profile, and wherein the latching members are engaged by the corresponding engaging slots.

7. The capacitor holding apparatus of claim 6, wherein the receiving slots are aligned with the corresponding holding slots of the holder to accommodate the capacitors, each receiving slot having a dimension smaller than the lateral projection of each capacitor.

8. The capacitor holding apparatus of claim 7, wherein each side wall that defines the holding slot includes a contour correspondingly matching the external shape of the capacitor.

9. The capacitor holding apparatus of claim 6, wherein each holding slot is defined by an end wall and a pair of side walls, and wherein each side wall of the holding slot contacts the main body of the capacitor.

10. The capacitor holding apparatus of claim 9, wherein the leads of capacitor are arranged away from the holder.

\* \* \* \* \*